United States Patent [19]

Hem et al.

[11] 3,911,090

[45] Oct. 7, 1975

[54] ALUMINUM HYDROXY CARBONATES NUCLEATED WITH SILICATE ANION

[75] Inventors: Stanley L. Hem, West Lafayette; Joe L. White, Lafayette, both of Ind.

[73] Assignee: Purdue Research Foundation, Lafayette, Ind.

[22] Filed: May 14, 1973

[21] Appl. No.: 360,110

[52] U.S. Cl. ............... 423/419; 423/420; 423/421; 423/427; 423/629; 424/156; 424/158
[51] Int. Cl.[2] ................. C01F 7/08; A61K 33/08; A61K 33/10
[58] Field of Search .......... 423/419, 420, 421, 427, 423/429, 625, 629, 630; 424/154, 156, 157

[56] References Cited
UNITED STATES PATENTS

| | | | |
|---|---|---|---|
| 2,783,124 | 2/1957 | Grote | 424/156 |
| 2,783,179 | 2/1957 | Grote | 423/419 |
| 2,888,323 | 5/1959 | Teichner | 423/628 |
| 3,459,502 | 8/1969 | Van Nordstrand | 423/629 |
| 3,501,264 | 3/1970 | Pilato | 423/628 |
| 3,557,025 | 1/1971 | Emerson et al. | 423/419 |

FOREIGN PATENTS OR APPLICATIONS

| | | | |
|---|---|---|---|
| 560,091 | 7/1958 | Canada | 423/625 |
| 47-38318 | 9/1972 | Japan | 423/625 |

OTHER PUBLICATIONS

Rosin, Joseph, Reagent Chemicals and Standards 3rd Edition, P. Van Nostrand Company Inc. N.Y., N.Y., 1955 pp. 400–402.

*Primary Examiner*—Oscar R. Vertiz
*Assistant Examiner*—Gary P. Straub

[57] ABSTRACT

Aluminum hydroxy carbonates having the antacid properties of liquid aluminum hydroxide gel are produced by preparing the aluminum hydroxy carbonates in the presence of silicate anion.

12 Claims, No Drawings

ALUMINUM HYDROXY CARBONATES NUCLEATED WITH SILICATE ANION

This invention relates to aluminum hydroxy carbonates nucleated with silicate anion and which possess the antacid properties of liquid aluminum hydroxide gel. This invention further relates to methods of preparing aluminum hydroxy carbonates which on storage for long periods of time retain their initial antacid properties.

At the present time, aluminum hydroxide gel is the most widely used antacid as it possesses many of the properties of the ideal antacid. It neutralizes a large quantity of acid, maintains the pH in the stomach between 3 to 5 while reacting, and does not cause alkalosis. When aluminum hydroxide gel is dried to produce a powder which can be used to prepare solid dosage forms, however, its total reactivity, as well as its rate of reaction with acid, is decreased. In addition, increasingly greater losses in reactivity occur when the dried aluminum hydroxide is aged at ambient or elevated temperatures. As a result of this instability, liquid aluminum hydroxide gels are considerably more effective than dried aluminum hydroxide gels. However, those individuals requiring antacid therapy would prefer a portable solid dosage form which would be more convenient to use. Attempts have been made to improve the stability and reactivity of dried aluminum hydroxide gel by adding glycine or carboxylic acids to the liquid gel prior to drying. Another approach has been to combine aluminum hydroxide with magnesium hydroxide gels prior to drying. None of these approaches have been completely successful in producing a dried aluminum hydroxide gel which possesses and retains the acid reactivity of liquid aluminum hydroxide gel.

It is an object of this invention to provide a new aluminum hydroxy carbonate which possesses the desirable antacid properties of liquid aluminum hydroxide gel and which will, due to its crystalline nature, retain its reactivity upon drying as well as during aging.

It is also an object of this invention to provide a process for preparing a new aluminum hydroxy carbonate which possesses the properties of liquid aluminum hydroxide gel.

The aluminum hydroxy carbonates of this invention are crystalline aluminum hydroxy carbonates having the chemical formula:

$$M(Al[OH]_2CO_3) \qquad (1)$$

where M is $Li^+$, $Na^+$, $K^+$, or $NH_3^+$ nucleated with 0.1 to 0.00001 mole of an alkali metal silicate per mole of $Al_2O_3$ in the crystalline aluminum hydroxy carbonate.

The aluminum hydroxy carbonates of this invention are prepared by carrying out a conventional procedure for preparing aluminum hydroxy carbonates but in the presence of an alkali metal silicate. The preferred alkali metal silicates are potassium silicate or sodium silicate. The quantity of silicate used can range from 0.1 to 0.00001 mole per mole of $Al_2O_3$ calculated in the finished gel. As the concentration of silicate approaches 0.1 mole per mole of $Al_2O_3$, the product exhibits increasingly higher viscosities. It is preferred that the concentration of silicate anion in the process range from about 0.01 to about 0.0001 mole per mole of $Al_2O_3$ calculated in the finished gel.

The product obtained is a crystalline material possessing antacid properties identical to amorphous aluminum hydroxide gel. The crystal size is inversely related to the concentration of silicate anion, as indicated by sharper peaks obtained in X-ray diffraction patterns as the concentration of silicate is decreased from 1/100 to 1/1000 mole per mole of $Al_2O_3$ and so on. Line broadening measurements confirm that the silicate acts as a nucleating agent. Thus a high concentration of silicate ions causes the nucleation of a large number of particles, which produces a very small particle size; and a low concentration of silicate anions (1,1000–1/10,000 mole per mole of $Al_2O_3$ nucleate fewer particles, which then grow into larger crystallites.

The synthetic crystalline aluminum hydroxy carbonates of this invention are similar to dawsonite, a naturally occuring sodium aluminum hydroxy carbonate. The material prepared by nucleation with silicate anion, as described in this invention, however, has a very much smaller crystal size, in the order of about 100 Angstroms at 0.01 mole of silicate per mole of $Al_2O_3$, than that observed for dawsonite which is about 1 millimeter.

The method by which the aluminum hydroxy carbonate of this invention is prepared (including addition of silicate) is not critical and can be any of the well-known methods, e.g., by the method described in the Journal of Pharmaceutical Sciences, 59, 317 (1970), wherein a soluble aluminum salt such as aluminum chloride, aluminum sulfate and the like is added to a basic aqueous solution, such as an alkali metal carbonate and/or bicarbonate solution or an ammonium hydroxide solution. Alternately, the aluminum hydroxy carbonate (again with the addition of silicate) may be prepared by the hydrolysis of an aluminum alkoxide such as aluminum isopropoxide as described in the J. Pharm. Pharmacol. 13, 95T (1961) or in U.S. Pat. No. 2,783,179, issued Feb. 26, 1957. As contemplated, the process of the instant invention can be used with any method for preparing liquid aluminum hydroxide. Attention is invited to an article showing equivalency of aluminum sulfate and aluminum chloride - See 33 Min. Mag. 749 (1964).

In the preferred embodiment of this invention, an aqueous solution containing 0.5 to 1.0 moles of aluminum chloride hexahydrate at a concentration of about 8 to 16% by weight at room temperature is added to an aqueous solution containing about 0.4 to 1.0 moles of carbonate at a concentration of about 1.0 to 5% by weight and preferably 1.0 to 2.5 moles of bicarbonate at a concentration of about 2 to 6% by weight when the carbonate is sodium or potassium carbonate. The silicate ion is added to the solution of carbonates and bicarbonate prior to the addition of the aluminum salt. The quantities and concentration of reactants are controlled so that the aluminum hydroxy carbonate is formed at a pH of about 6 to 8. The product obtained is filtered and washed with deionized water until the concentration of chloride ion falls to less the 0.1%. The product is dried at room temperature as a sharp loss in reactivity occurs when the product is dried from water at elevated temperatures. The loss is reduced if the product is predried at 25° prior to heating.

The use of Applicant's invention described in their copending application Ser. No. 360,943 entitled Stable Dry Aluminum Hydroxide Gel filed May 14, 1973 allows the gel to be dried at higher temperatures and, furthermore, yields a gel containing a higher level of $Al_2O_3$ which retains all of its reactivity even after heating for 14 hours at 180°F. In this invention, the aqueous reaction media is replaced with a water miscible non-aqueous solvent, e.g., ethanol or ethanol containing 50% or less of benzene. The aqueous media is replaced by standard techniques, e.g., by extraction or by adding a volume of water miscible non-aqueous solvent equal to the volume of the liquid aluminum hydroxy carbonate to the aqueous mixture and thoroughly mixing. The solvent and water are removed by decantation or vacuum filtration, being careful to maintain the aluminum hydroxide gel as a moist cake. If required to remove the water, a second portion of the non-aqueous solvent is added and the moist cake is thoroughly redispersed by mixing. The vehicle is removed as before; and if again required, the moist cake is treated with a third portion of the non-aqueous solvent. The aluminum hydroxy carbonate prepared in this manner is dried from the non-aqueous solvent by any conventional method, e.g., at room temperature under vacuum or in a forced air oven at temperatures up to 180°F.

As the aluminum hydroxy carbonates have a definite crystalline structure, a limiting aluminum content equivalent to 38% $Al_2O_3$ is reached when an aluminum hydroxy carbonate is dried from water. Drying from ethanol results in a higher equivalent $Al_2O_3$ content in the area of 40%.

The aluminum hydroxy carbonates of this invention retain the same high acid reactivity as liquid aluminum hydroxide gel on aging as measured by the Rossett Rice time. The Rossett Rice time is the length of time a quantity of the dry gel equivalent to 300 mg. of aluminum oxide in 70 millimeters of 0.1 N hydrochloric acid and 30 millimeters of water at 37°C remains at a pH between 3 to 5 as 0.1 N-hydrochloric acid is added to the mixture at a rate of 4 milliliters per minute. Dry amorphous aluminum hydroxide gels decrease in acid reactivity when stored at either 25° or 40°C, and normally have no Rossett-Rice reactivity after aging for 6 months at 40°C. Most commercial dried aluminum hydroxide gels lose all of their Rossett-Rice activity after 1 year at 25°C. In contrast, the aluminum hydroxy carbonates prepared by nucleation with silicate according to this invention and dried from water at 25°C retains virtually all of the reactivity of the liquid gel after storage at 40° for 11 months. The Rossett Rice time for the nucleated aluminum hydroxy carbonates of this invention is greater than 20 minutes after aging for 11 months at 40°C. In addition, no change in acid consuming capacity was noted for the dried aluminum hydroxy carbonates of this invention after aging for 11 months at 40° in comparison to a 10% loss for non-nucleated aluminum hydroxide gels after aging for 6 months at 40°C. The acid consuming capacity is the number of milliliters of 0.1 N hydrochloric acid required to neutralize 1 gram equivalent of $Al_2O_3$ in the final product. The dried aluminum hydroxy carbonate prepared by nucleation with silicate anion possesses all the desirable antacid properties of liquid aluminum hydroxide gel and more significantly retains these properties upon aging. Solid antacid dosage forms can therefore be prepared which would be as effective as liquid aluminum hydroxide gel in the reduction of stomach acidity.

EXAMPLE 1

Sodium Aluminum Hydroxy Carbonate

In a 5 liter beaker, an 11.4% aqueous solution containing 0.755 moles of aluminum chloride hexahydrate is added to an aqueous solution containing 2.8% sodium carbonate (0.57 moles), 4.5% sodium bicarbonate (1.336 moles) and 0.034% sodium silicate (0.00376 moles). The mixture is stirred for a few minutes at room temperature; and the sodium aluminum hydroxy carbonate formed is washed several times with de-ionized water to yield 500 milliliters of liquid crystalline sodium aluminum hydroxy carbonate. The product is dried at room temperature in a vacuum desiccator.

A similarly prepared sodium aluminum carbonate nucleated with sodium silicate was treated three times with a volume of ethanol equal to the volume of sodium aluminum hydroxy carbonate by thoroughly dispersing the carbonate in the alcohol and filtering through a Buckner funnel using number 1 filter paper being careful to maintain the sodium aluminum hydroxy carbonate as a moist cake. The final product was dried at room temperature under vacuum.

Table I below shows the Rossett-Rice time, lag time and acid consuming capacity at various aging stages for the crystalline nucleated sodium aluminum carbonates above in both the liquid and dried state and also for for non-nucleated, non-crystalline aluminum hydroxide gels including a commercial aluminum hydroxy gel prepared by the same procedure as above without the sodium silicate. The structure of these aluminum hydroxide gels is unknown. The commonly used designation $Al_2O_3$ or $Al(OH)_3$ does not represent the composition of these materials as they are known to contain $CO_3^=$. The crystalline aluminum hydroxy carbonate of the present invention possesses a specific known structure, and the specific structure of the aluminum hydroxy carbonates can be varied to produce the desired properties. For example, aluminum hydroxy carbonates containing any desired level of sodium can be prepared using a mixture of sodium and potassium carbonate.

The Rossett Rice time and acid consuming capacity are described previously and the lag time is the length of time required for the pH to reach 3.0 after the addition of the hydrochloric acid commences in the Rossett Rice time determination. The % $Al_2O_3$ shown is obtained by the standard ethylenediaminetetraacetic acid tetration described in the U.S. Pharmacopeia.

Table I

| | Solvent | % $Al_2O_3$ | Age* | Non-nucleated Aluminum Hydroxide Rossett Rice Time (min) | Lag Time (min) | Acid Consuming Capacity |
|---|---|---|---|---|---|---|
| 1. | Liquid (not dried) | 3.2 | Initial | 32 | 0 | 650 |
| 2. | Water | 34.2 | Initial | 26 | 0 | 650 |
| 3. | Water | — | 10 days 40° | 23 | 1 | 650 |
| 4. | Water | 38.6 | 2 months 40° | 10 | 3 | 640 |
| 5. | Liquid (not dried) | 3.5 | Initial | 26 | 0 | 625 |

Table I – Continued

Non-nucleated Aluminum Hydroxide

|    | Solvent            | % Al₂O₃ | Age*          | Rossett Rice Time (min) | Lag Time (min) | Acid Consuming Capacity |
|----|--------------------|---------|---------------|-------------------------|----------------|-------------------------|
| 6. | Water              | 34.7    | Initial       | 24                      | 1              | 635                     |
| 7. | Water              | 35.2    | 6 months 40°  | 0                       | —              | 600                     |
| 8. | Water              | —       | 5 months 25°  | 10                      | 2              | —                       |
| 9. | Commercial product | 50.8    | 1 year 25°    | 0                       | —              | 570                     |

Nucleated Sodium Aluminum Hydroxy Carbonate

|     | Solvent           | % Al₂O₃ | Age           | Rossett Rice Time (min) | Lag Time (min) | Acid Consuming Capacity |
|-----|-------------------|---------|---------------|-------------------------|----------------|-------------------------|
| 10. | Liquid (not dried)| 2.41    | Initial       | 28                      | 0              | 650                     |
| 11. | Water             | 32.4    | Initial       | 28                      | 0              | 650                     |
| 12. | Water             | 33.4    | 3 months 40°  | 25                      | ½              | —                       |
| 13. | Water             | 35.3    | 11 months 40° | 26                      | 1              | 650                     |

*The temperatures shown in the tables of this application are in °C.

|     | Solvent            | % Al₂O₃ | Age           | Rossett Rice Time (min) | Lag Time (min) | Acid Consuming Capacity |
|-----|--------------------|---------|---------------|-------------------------|----------------|-------------------------|
| 14. | Liquid (not dried) | 2.6     | Initial       | 31                      | ½              | —                       |
| 15. | Ethanol (USP)      | 37.5    | Initial       | 27                      | ½              | 650                     |
| 16. | Ethanol (absolute) | 34.1    | Initial       | 31                      | ½              | —                       |
| 17. | Ethanol (USP)      | 38.4    | 2 months 40°  | 30                      | 1              | —                       |
| 18. | Ethanol (absolute) | 36.5    | 2 months 40°  | 30                      | 1              | —                       |

As can be seen from the above data, the standard dried aluminum hydroxy gel loses about ⅔ of its reactivity after 2 months aging at 40°C; and by the end of 6 months at this temperature it has lost all of its reactivity as measured by the Rossett Rice time and about 10% of its acid consuming capacity. The nucleated sodium aluminum hydroxy carbonate, on the other hand, exhibits the same reactivity and acid consuming capacity on aging for both 11 months when dried from water and at 2 months when dried from ethanol. It should be noted that the commercial product, after aging for one year at room temperature, loses all its reactivity and about 15% of its acid consuming capacity.

Table II below shows the results of drying the nucleated sodium aluminum hydroxy carbonate of this invention under various conditions in a forced air oven.

Table II

|     | Solvent            | Time and Oven Temp.                                                          | Equivalent Al₂O₃ | Rossett Rice Time (min) | Lag Time |
|-----|--------------------|------------------------------------------------------------------------------|------------------|-------------------------|----------|
| 19. | Liquid (not dried) | —                                                                            | 2.8%             | 30                      | 0        |
| 20. | Water              | vacuum desiccator at RT                                                      | 30.0%            | 30                      | 0        |
| 21. | Water              | 6 ½ hrs. at 150°F                                                            | 37.9%            | 10                      | 1 ½      |
| 22. | Water              | 6 ½ hrs. at 150°F followed by 5 hrs. at 180°F                                | 37.9%            | 0                       | —        |
| 23. | Water              | 6 ½ hours. at 150°F followed by 17 hrs. at 180°F                             | 37.7%            | 0                       | —        |
| 24. | Water              | 6 ½ hrs. at 150°F followed by 42 hrs. at 180°F.                              | 38.7%            | 0                       | —        |
| 25. | Water              | dried to powder in vacuum desiccator at RT followed by 24 hrs at 180°F       | 38.2%            | 24                      | ½        |
| 26. | Ethanol, USP       | 2 hrs. at 120°F                                                              | 37.8%            | 32                      | 0        |
| 27. | Ethanol, USP       | 5 ¾ hrs. at 120°F                                                            | 39.5%            | 30                      | 0        |
| 28. | Ethanol, USP       | 5 ¾ hrs. at 120°F followed by 4 hrs. at 160°F                                | 42.1%            | 30                      | 0        |
| 29. | Ethanol, USP       | 5 ¾ hrs. at 120°F followed by 4 hrs. at 160°F followed by 14 hrs. at 180°F   | 43.2%            | 31                      | 0        |
| 30. | Ethanol, USP       | 5 ¾ hrs. at 120°F followed by 4 hrs at 160°F followed by 37 hrs. at 180°F    | 44.1%            | 28½                     | 0        |

It is clear from the above data that drying at elevated temperatures from water (test 20 to 24) seriously damages the reactivity of the sodium aluminum hydroxy carbonate. Preliminary drying from water in a disiccator followed by further drying at an elevated temperature (test 25) does not appreciably affect the reactivity. When the product is dried from ethanol in a forced air oven (tests 26 to 30), elevated temperatures do not have any effect on the reactivity.

Table (III) below shows the initial reactivity for the above aluminum hydroxy carbonate nucleated with various quantities of sodium silicate and dried from water or ethanol.

Table III

Sodium Aluminum Hydroxy Carbonate

| Silicate / $Al_2O_3$ mole ratio | Drying Conditions | Equivalent % $Al_2O_3$ | Rossett Rice Time (min) | Lag Time (min) |
|---|---|---|---|---|
| 1/1000 | Liquid (not dried) | 4.4 | 25 | ½ |
| " | Water RT | 37.6 | 24 | 1 |
| " | Ethanol, 150° | 45.8 | 26 | 1 |
| 1/3000 | Liquid (not dried) | 3.9 | 24 | 0 |
| " | Water RT | 38.6 | 23 | 1 |
| " | Ethanol, 150° | 47.4 | 26 | ½ |
| 1/10,000 | Liquid (not dried) | 3.6 | 26 | 0 |
| " | water RT | 39.3 | 24 | ½ |
| " | Ethanol, 150° USP | 48.5 | 27 | ½ |

The above data demonstrates that superior antacid properties are obtained at lower sodium silicate nucleation levels.

EXAMPLE 2

Potassium Aluminum Hydroxy Carbonate and Ammonium Aluminum Hydroxy Carbonate

When an equivalent amount of potassium carbonate and potassium bicarbonate or ammonium carbonate is used in place of the sodium carbonate and sodium bicarbonate in Example 1, there is obtained nucleated potassium aluminium hydroxy carbonate or nucleated ammonium aluminum hydroxy carbonate respectively.

Table IV below shows the antacid activity of the above aluminum hydroxy carbonates nucleated with various quantities of sodium silicate and dried from water or ethanol.

Table IV

Potassium Aluminum Hydroxy Carbonate

| Silicate mole ratio | Drying Conditions | Equivalent % $Al_2O_3$ | Rossett Rice Time (min) | Lag Time (min) |
|---|---|---|---|---|
| 1/100 | Liquid (not dried) | 3.8 | 26 | ¾ |
| " | Water RT | 33.8 | 25 | ½ |
| " | Ethanol, 150° | 44.5 | 27 | ½ |
| 1/1000 | Liquid (not dried) | 3.8 | 24 | ½ |
| " | Water RT | 41.4 | 28 | 1 |
| " | Ethanol, 150° | 48.8 | 28 | ¾ |
| Ammonium Aluminum Hydroxy Carbonate | | | | |
| 1/100 | Liquid (not dried) | 3.3 | 33 | ¾ |
| " | Water RT | 37.1 | 29 | 1 |
| " | Ethanol, 150° | 40.0 | 31 | 2 |

It should be noted that the Rossett Rice time for the dried aluminum hydroxy carbonates above dried from ethanol at elevated temperature, which is indicative of the effects of aging of the compound, demonstrates the exceptional stability of the nucleated compounds of this invention.

Similar products are obtained when an equivalent amount of lithium silicate or potassium silicate is used in place of the sodium silicate in Examples 1 and 2 above.

What is claimed is:

1. A crystalline aluminum hydroxy carbonate of the formula M (Al[OH]$_2$CO$_3$) where M is Li$^+$, Na$^+$, K$^+$, or NH$_4^+$ prepared with 0.01 to 0.0001 mole of an alkaline metal silicate per mole of $Al_2O_3$ in the crystalline aluminum hydroxy carbonate inclusive of impurities therein.

2. A crystalline aluminum hydroxy carbonate according to claim 1 having a Rossett Rice time of 20 min. to 32 min. when aged 11 months at 40°C.

3. A crystalline aluminum hydroxy carbonate according to claim 1 in which M is K$^+$, Na$^+$ or NH$_4^+$.

4. A crystalline aluminum hydroxy carbonate according to claim 1 in which the alkali metal silicate is lithium silicate, sodium silicate or potassium silicate.

5. A crystalline aluminum hydroxy carbonate according to claim 1 in which the alkali metal silicate is sodium silicate.

6. The crystalline aluminum hydroxy carbonate according to claim 1 which is sodium aluminum hydroxy carbonate prepared with 0.01 moles of sodium silicate per mole of $Al_2O_3$ in the sodium aluminum hydroxy carbonate.

7. The crystalline aluminum hydroxy carbonate according to claim 1 which is potassium aluminum hydroxy carbonate prepared with 0.01 moles of sodium silicate per mole of $Al_2O_3$ in the potassium aluminum hydroxy carbonate.

8. The crystalline aluminum hydroxy carbonate according to claim 1 which is ammonium aluminum hydroxy carbonate prepared with 0.01 moles of sodium silicate per mole of $Al_2O_3$ in the ammonium aluminum hydroxy carbonate.

9. A process for preparing crystalline aluminum hydroxy carbonate which comprises synthesizing the corresponding aluminum hydroxide carbonate in the presence of 0.01 to 0.0001 mole of an alkaline metal silicate per mole of $Al_2O_3$ calculated in the crystalline aluminum hydroxy carbonate produced.

10. The process of claim 9 wherein the synthesis is carried out in the presence of 0.01 moles of alkali metal silicate per mole of $Al_2O_3$ calculated in the crystalline aluminum hydroxy carbonate produced.

11. The process of claim 9 wherein the crystalline hydroxy carbonate is precipitated at a pH of 6.0 to 8.0 by adding an aqueous solution containing 0.5 to 1.0 moles of aluminum chloride to a solution containing 0.01 to 0.0001 mole of sodium silicate per mole of $Al_2O_3$ calculated in the crystalline aluminum hydroxy carbonate produced and a member selected from the group consisting of 1) 0.4 to 1.0 moles of sodium carbonate and 1.0 to 2.5 moles of sodium bicarbonate; 2) 0.4 to 1.0 moles of potassium carbonate and 1.0 to 2.5 moles of potassium bicarbonate; or 3) A quantity of ammonium carbonate sufficient to supply 0.5 to 1.5 moles of carbonate (CO$_3^=$) when mixed with water.

12. The process of claim 9 wherein an 11.4% aqueous solution containing 0.755 moles of aluminum chloride hexahydrate is added to a solution containing 0.0037 moles of sodium silicate at a concentration by weight of 0.034% and 0.570 mole of sodium carbonate at a concentration of 2.8% by weight and 1.336 moles of sodium bicarbonate at a concentration of 4.5%.

\* \* \* \* \*